Sept. 2, 1958 W. E. BRILL 2,850,340
PISTON PIN RETAINER AND METHOD OF INSERTING SAME
Filed April 7, 1954
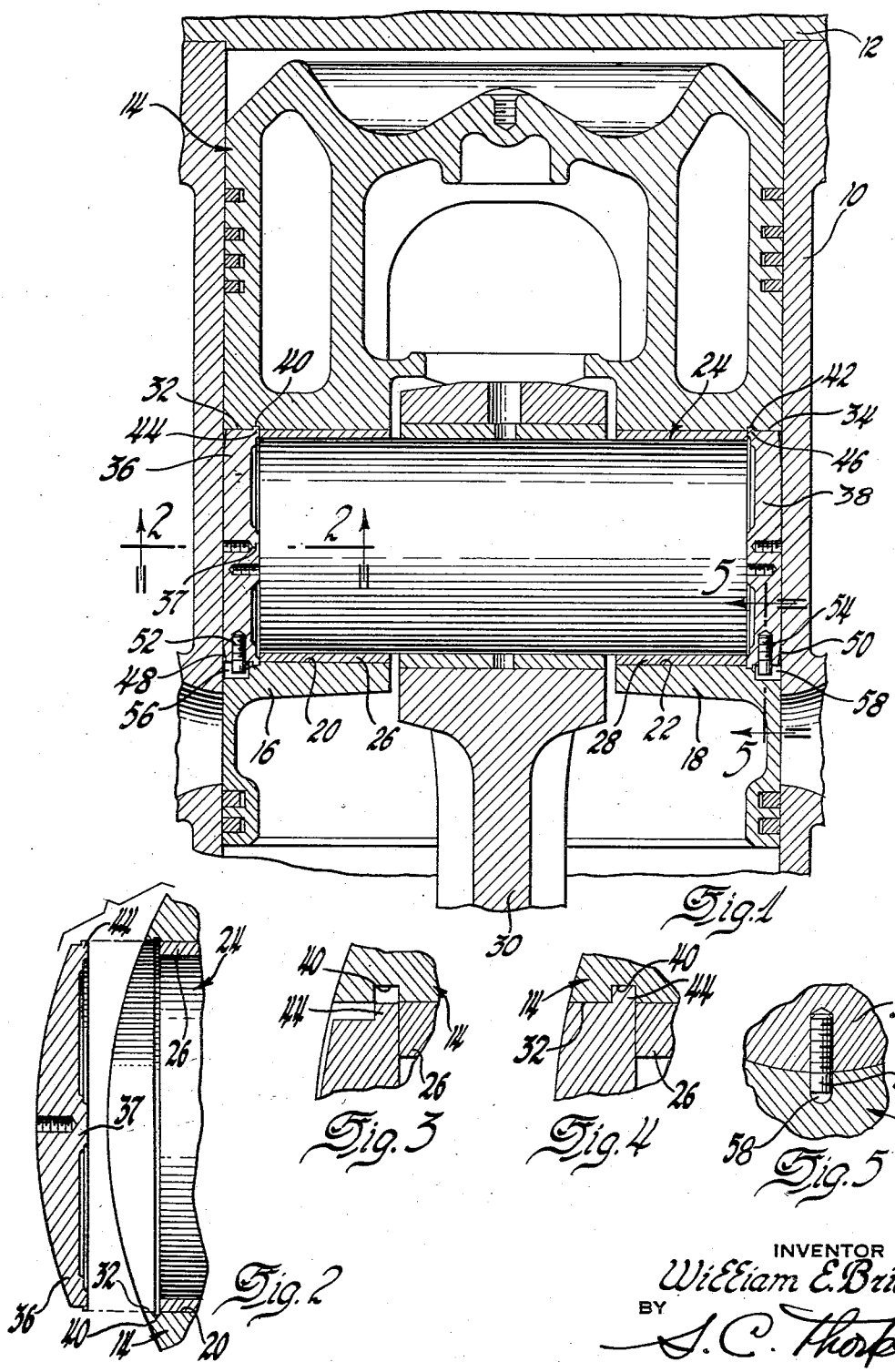
INVENTOR
William E. Brill
BY
J. C. Thorpe

United States Patent Office 2,850,340
Patented Sept. 2, 1958

2,850,340

PISTON PIN RETAINER AND METHOD OF INSERTING SAME

William Elmer Brill, Cleveland, Ohio, assignor to General Motors Corporation, Detroit, Mich., a corporation of Delaware Application April 7, 1954, Serial No. 421,607

14 Claims. (Cl. 309—19)

This invention relates to piston construction and particularly to means for retaining the piston pin in place and to a method for inserting and securing such piston pin retaining means in place.

The primary object of my invention is to provide an improved piston pin retaining cap which will be retained in place under vibration and thermal expansion of the piston. The invention has particular application to large diesel engines in which the diameter and mass of the piston wrist pin are relatively large. However, its use is not limited to engines of this particular type and is considered adaptable to conventional internal combustion engines generally.

The invention comprises a piston pin retaining cap having an extended peripheral lip or flange which, when the cap has been cooled such as with Dry Ice, will pass into a counterbored recess formed in the piston pin bore. As the cap warms up to normal temperatures after assembly, the lip on the cap expands into an inwardly facing annular groove formed at the base of the counterbored recess and is thus retained. The cap is made of a material having a substanitally greater thermal expansion rate than the material of which the piston is made whereby the overlap of the cap flange or lip within the annular groove increases as the engine warms up in operation. The thickness of the cap measured from the flange towards its outer end axially of the bore is such that the outer surface of the cap is recessed inwardly of the piston surface so as not to bear on the cylinder bore in operation.

Other objects and advantages of the present invention will be apparent from the following description, reference being made to the accompanying drawings wherein a preferred embodiment of my invention is clearly shown.

In the drawing:

Figure 1 is a sectional view of an engine cylinder and piston assembly.

Figure 2 is an enlarged exploded sectional view of the piston showing the piston pin bore substantially along the line 2—2 of Figure 1 with the piston pin retaining cap of my invention just prior to assembly.

Figure 3 is a further enlarged broken section showing the piston and retaining cap during assembly.

Figure 4 is a broken sectional view similar to Figure 3 showing the respective parts at normal operating temperatures.

Figure 5 is an enlarged broken sectional view taken substantially along the line 5—5 of Figure 1.

Referring to the drawing, an internal combustion engine cylinder 10 closed at one end as at 12 is provided with a relatively hollow piston 14 reciprocably mounted therein. The piston is provided with a pair of aligned bosses 16 and 18 having diametrically opposed apertures or wrist pin bores 20 and 22 therein. A piston pin 24 is rotatably mounted in bushings 26 and 28 provided within the aligned bores 20 and 22, respectively, and serves as a trunnion for the upper end of a connecting rod 30 which is connected at its opposite end to the crankshaft of the engine, not shown. The inner ends of the bushings 26 and 28 may be either flush with or slightly recessed from the faces of the bosses 16 and 18 while the outer ends of the bushings are recessed within the outer ends of bores 20 and 22 to provide, in effect, counterbores 32 and 34 for receiving disk-shaped piston pin retaining caps or plugs 36 and 38, respectively.

The wrist pin bores 16 and 18 are provided with inwardly facing annular grooves 40 and 42, respectively, formed therein adjacent the outer end of each wrist pin bushing, and each of the caps is provided with a peripheral flange or lip 44 or 46 engageable with the groove 40 or 42, respectively, when installed. As shown in Figures 2 and 3, the diameter of each bore and cap flange is such that when the cap is cooled to a very low temperature by suitable means, such as Dry Ice giving a temperature of approximately minus 80° F., the cap can be inserted within the bore against the end of the piston pin and the outer end of the bushing bringing the cap flange to a position opposite the groove. Upon subsequent equalization of the cap and piston temperatures the flange will engage the groove to retain the cap in place.

The inwardly presented faces of the caps 36 and 38 are provided with raised bosses 37 and 39, respectively, which bear against their respective ends of the piston pin in thrust relation. The outwardly presented faces of the caps 36 and 38 are formed to conform to the curvature of the cylinder and the thickness of each cap measured from the flange towards its outer end axially of the bore is such that the outer end of the cap is recessed inwardly of the piston providing sufficient clearance between the cap and cylinder wall so that the cap will not scrape on the cylinder wall in operation or interfere with the cylinder porting and port bridging in two-cycle engine applications. As an added precaution against such interference and scraping, the edges of the outwardly exposed faces of the caps 36 and 38 are chamfered as indicated at 48 and 50 and the caps are each retained against rotation in the wrist pin bores as shown in Figure 5 by radial pins or screws 52 and 54 engaging key grooves 56 and 58, respectively, extending axially of the wrist pin bores within the counterbored portions a short distance.

In the preferred embodiment of my invention the cap is made of a material, such as an aluminum alloy, having a substantially greater thermal expansion rate than the material from which the piston is made, such as cast iron, whereby the overlap of the cap or lip within the annular groove increases as the engine warms in operation. As best seen in Figure 4, the diameters of the caps below their respective lip or flanged portion and of their flange should be such that the fit of these portions of the cap within the piston pin bore and grooves, respectively, will be relatively loose at normal nonoperating temperatures and relatively tight at normal operating temperatures.

Only one embodiment of the invention has been shown and described for the purpose of illustration, but it will be appreciated that various minor modifications may be made without departing from the spirit and scope of the invention as defined in the following claims.

I claim:

1. In combination with a cylinder, a piston reciprocably mounted therein and having a wrist pin bore extending therethrough, an inwardly facing annular groove formed adjacent the outer end of said bore, and a relatively rigid piston pin retainer cap closing the outer end of said bore, said retainer cap having a peripheral flange engaging said groove and having a reduced diameter portion engaging said bore in axially spaced relation to said groove.

2. A piston having a wrist pin bore extending therethrough, an inwardly facing annular groove formed adjacent the outer end of said bore, and a piston pin retainer cap closing the outer end of said bore, said retainer cap having a rigid peripheral portion defining a peripheral flange engaging said groove and a reduced diameter cylindrical surface engaging said bore.

3. In combination with a cylinder, a piston reciprocably mounted therein and having a wrist pin bore extending therethrough, an annular groove opening on said bore adjacent each of the outer ends thereof, a piston pin in said bore intermediate said grooves, piston pin retainers comprising relatively rigid disk-shaped caps mounted in the outer ends of said bore, each of said caps having a substantially flat inner face adapted to bear on the adjacent end of said piston pin, a peripheral flange portions engaging the adjacent one of said grooves and a reduced diameter cylindrical portion engaging said bore outwardly of said flanged portion.

4. A cast iron engine piston having a wrist pin bore extending therethrough, an annular groove opening on said bore adjacent the outer end thereof, and a piston pin retainer comprising a disk-shaped aluminum cap having a substantially flat inner face adapted to bear on the wrist pin and having an arcuate outer face, said cap having a peripheral flange portion engaging said groove and a reduced diameter portion tightly engaging said bore outwardly of said flange at normal engine operating temperatures.

5. A cast iron internal combustion engine piston having a wrist pin bore extending therethrough, an annular groove opening on said bore adjacent the outer end thereof, a piston pin in said bore terminating short of said groove, and a piston pin retainer comprising a disk-shaped aluminum cap having a substantially flat inner face adapted to bear on the wrist pin and having an arcuate outer face, said cap having a peripheral flange portion engaging said groove and a reduced diameter portion tightly engaging said groove and said bore respectively at normal engine operating temperatures.

6. A piston having a wrist pin bore extending therethrough, said bore having a counterbore near its outer end forming an annular shoulder, an inwardly facing annular groove formed in said counterbore adjacent said shoulder, and a relatively rigid piston pin retainer cap abutting said shoulder and having a peripheral flange engaging said groove and a reduced diameter cylindrical portion engaging said counterbore in axially spaced relation to said groove.

7. In combination with a cylinder, a piston reciprocably mounted in said cylinder having aligned wrist pin bores extending therethrough, said bores having counterbores near their respective outer ends to form shoulders, a piston pin fitted within said bores intermediate said shoulders, inwardly facing annular grooves formed in said counterbores adjacent said shoulders, and a piston pin retainer cap mounted in each of said counterbores in abutment with said shoulders, and each of said retainer caps having a rigid peripheral portion defining a cylindrical surface and a peripheral flange engaging its respective counterbore and groove, and each of said retainer caps including bearing means in thrust relation to the end of said pin adjacent thereto.

8. In combination with a cylinder, a piston reciprocably mounted therein having aligned bores for a wrist pin, a pin fitted in said bores, an annular groove opening on each of said bores adjacent its outer end, and piston pin retainers comprising disk-shaped caps having substantially flat inner faces in bearing contact with the ends of said pin and having arcuate outer faces spaced from said cylinder, said cap having a rigid peripheral portion defining a peripheral flange portion engaging said groove and a reduced diameter cylindrical portion engaging said bore.

9. In a piston assembly, a piston having a wrist pin bore therethrough, an annular groove opening on said bore adjacent the outer end thereof, and a piston pin retainer closing said bore comprising a disk-shaped cap having a peripheral lip thereon engaging said groove, said cap having a thermal expansion rate greater than the piston whereby the overlap of the cap flange within the groove increases as the assembly is warmed up in operation.

10. In a piston assembly, a piston having a wrist pin bore therethrough, an annular groove opening on said bore adjacent the outer end thereof, and a piston pin retainer closing said bore comprising a disk-shaped cap having a peripheral lip thereon engageable with said groove, said cap having a thermal expansion rate greater than the piston whereby the cap may be reduced in diameter prior to insertion in said wrist pin bore and an overlap of the cap flange within the groove occurs upon equalization in temperatures.

11. In combination with an engine cylinder, a piston reciprocably mounted therein and having a wrist pin bore therethrough, an annular groove opening on said bore adjacent each of the outer ends thereof, a piston pin mounted in said bore intermediate said grooves, and piston pin retainers closing the outer ends of said bore and comprising disk-shaped caps, each of said caps having a substantially flat inner face with a raised boss thereon adapted to bear on the wrist pin ends in thrust relation and having an arcuate outer face conforming with and having clearance from said cylinder, each of said caps having a peripheral flange portion engageable with said groove and a reduced diameter portion engageable with said bore outwardly of their respective flanges, each of said caps having a thermal expansion rate greater than the piston whereby the cap may be reduced in diameter prior to insertion in said wrist pin bore and an overlap of the cap flange within the groove occurs upon equalization in temperatures of the piston and cap, and said flange and said reduced diameter portion of each cap being of such diameters that they tightly engage said groove and bore, respectively, at normal engine operating temperatures.

12. A method for assembling a piston for an engine including the steps of inserting a piston pin retaining cap within a piston pin mounting bore, said cap having a peripheral diameter greater than that of the piston pin bore and having a rate of thermal expansion greater than that of the piston; said method comprising the steps of cooling the retaining cap relative to the temperature of said piston until the contracted diameter of the cap permits insertion of the cap within the bore, inserting said cap in said bore, and permitting the temperature of the cap and piston to equalize whereby the cap is expanded into initial locked engagement with said bore the locking engagement between said cap and said bore being increased as the engine approaches its normal operating temperature due to the relatively greater expansion of said cap.

13. A hollow metallic article having a counterbored opening therein, an annular groove opening on said counterbore and having one side thereof co-extensive with the base of said counterbore, and a closure member for said opening comprising a disk having a rigid peripheral portion defining a peripheral flange portion engaging said groove and a reduced diameter cylindrical portion engaging said bore outwardly of said flange.

14. A hollow metallic article having a counterbored opening therein, an annular groove opening on said counterbore, a closure member for said opening comprising a disk-shaped cap having a coefficient of thermal expansion greater than that of said article, said cap having a peripheral flange portion of diameter greater than said counterbore and insertable within the counterbore by cooling contraction of the cap, said peripheral flange being in overlapping engagement with said groove at equalized article and cap temperatures.

(References on following page)

References Cited in the file of this patent

UNITED STATES PATENTS

| | | |
|---|---|---|
| 1,285,755 | McCuen | Nov. 26, 1918 |
| 1,547,288 | Baker | July 28, 1925 |
| 1,637,247 | Snyder | July 26, 1927 |
| 1,721,197 | Almen | July 16, 1929 |
| 1,955,728 | Allen et al. | Apr. 24, 1934 |
| 2,043,014 | Shoemaker | June 2, 1936 |
| 2,144,928 | Moncrieff | Jan. 24, 1939 |

FOREIGN PATENTS

| | | |
|---|---|---|
| 134,900 | Switzerland | Nov. 16, 1929 |
| 356,612 | Great Britain | Sept. 10, 1931 |